United States Patent
Donahue et al.

(10) Patent No.: US 11,914,980 B2
(45) Date of Patent: Feb. 27, 2024

(54) MANAGING DEPLOYMENTS OF SOFTWARE PROGRAMS TO DISTRIBUTED COMPUTING ENVIRONMENTS

(71) Applicant: Red Hat, Inc., Raleigh, NC (US)

(72) Inventors: Douglas Donahue, Westford, MA (US); Dana Gutride, Pepperell, MA (US); Zackary Allen, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 270 days.

(21) Appl. No.: 17/341,854

(22) Filed: Jun. 8, 2021

(65) Prior Publication Data
US 2022/0391185 A1    Dec. 8, 2022

(51) Int. Cl.
  *G06F 9/445* (2018.01)
  *G06F 8/60* (2018.01)
  *H04L 67/10* (2022.01)
  *H04L 67/00* (2022.01)

(52) U.S. Cl.
  CPC ............... *G06F 8/60* (2013.01); *H04L 67/10* (2013.01); *H04L 67/34* (2013.01)

(58) Field of Classification Search
  CPC ........................................................ G06F 8/60
  USPC ........................................................ 717/176
  See application file for complete search history.

(56) References Cited

U.S. PATENT DOCUMENTS

| | | | |
|---|---|---|---|
| 8,732,291 B2 | 5/2014 | Zhu et al. | |
| 8,838,801 B2 * | 9/2014 | Alapati | G06F 9/5072 709/224 |
| 9,300,552 B2 * | 3/2016 | Dube | H04L 41/14 |
| 9,588,749 B2 * | 3/2017 | Chen | G06F 8/64 |
| 9,612,812 B2 * | 4/2017 | Arcilla | G06F 8/60 |
| 2012/0158530 A1 * | 6/2012 | Shafiee | G06Q 30/0283 705/26.1 |

(Continued)

FOREIGN PATENT DOCUMENTS

CN    106533713 B    12/2019

OTHER PUBLICATIONS

Dubois, D.J. and Casale, G., "OptiSpot: Minimizing Application Deployment Cost Using Spot Cloud Resources," Cluster Comput, 2016, https://link.springer.com/article/10.1007/s10586-016-0568-7.

(Continued)

*Primary Examiner* — Evral E Bodden
(74) *Attorney, Agent, or Firm* — Kilpatrick Townsend & Stockton LLP

(57) ABSTRACT

Deployments of software programs to distributed computing environments can be managed according to some aspects described herein. In one example, a system can receive a deployment specification having deployment parameters that define a target deployment state for a software program deployable to a target computing environment. The system can generate, based on a mapping of the deployment parameters to resource consumption values, a resource consumption estimate associated with the target deployment state of the software program in the target computing environment. The system can generate a deployment metric based on the resource consumption estimate and transmit the deployment metric to a client device. The deployment metric can be usable to manage deployment of the software program.

18 Claims, 5 Drawing Sheets

(56) References Cited

U.S. PATENT DOCUMENTS

| | | | |
|---|---|---|---|
| 2013/0318520 A1* | 11/2013 | Abuelsaad | G06F 9/44505 |
| | | | 717/177 |
| 2016/0292298 A1* | 10/2016 | Yutani | G06F 16/9014 |
| 2021/0357835 A1* | 11/2021 | Modi | G06F 40/194 |
| 2022/0050670 A1* | 2/2022 | Liljeback | G06F 9/4881 |

OTHER PUBLICATIONS

Leitner, P., et al., "Modeling and Managing Deployment Costs of Microservice-Based Cloud Applications," University of Zurich, 2016, https://www.zora.uzh.ch/id/eprint/126370/1/ucc_acm_16.pdf.

Roy, N., et al., "Efficient Autoscaling in the Cloud Using Predictive Models for Workload Forecasting," IEEE, 2011, https:/ieeexplore.ieee.org/abstract/document/6008748.

Cho, K. and Bahn, H., "A Cost Estimation Model for Cloud Services and Applying to PC Laboratory Platforms," Processes, 2020, https://www.mdpi.com/2227-9717/8/1/76/htm.

Ellman, J., et al., "Cloud Computing Deployment: A Cost-Modelling Case Study," Wireless Networks, 2018, https://link.springer.com/article/10.1007/s11276-018-1881-2.

"Estimating AWS Deployment Costs for Microsoft SharePoint Serve," Amazon Web Services, Inc., 2016, https://d0.awsstatic.com/whitepapers/estimating-aws-deployment-costs-for-sharepoint.pdf.

* cited by examiner

```
apiVersion: apps/v1   \\ version of API being used for this Resource Definition(RD)
kind: Deployment      \\ type of Resource Definition
metadata:
  name: nginx-deployment \\ name being used for this Resource Definition
  labels:
    app: nginx \\ add a label to the Resource Definition that is "app=nginx"
spec:
  replicas: 3   \\ how many instances to startup (for failover and redundancy)
  selector:
    matchLabels:
      app: nginx \\ labels used for matching
  template:
    metadata:
      labels:
        app: nginx \\ another label
    spec:
      containers:
      - name: nginx      \\ name of the docker container
        image: nginx:1.14.2   \\ docker image name/version
        ports:
        - containerPort: 80   \\ port corresponding to the service/application in the container
      - name: kafka
        image: wurstmeister/kafka
        ports:
        - containerPort: 9092
      volumes:
      - name: websvr-storage   \\ name of volume (storage space)
        emptyDir: {}            \\ type of storage
```

FIG. 2

MANAGING DEPLOYMENTS OF SOFTWARE PROGRAMS TO DISTRIBUTED COMPUTING ENVIRONMENTS

TECHNICAL FIELD

The present disclosure relates generally to managing software deployments. More specifically, but not by way of limitation, this disclosure relates to managing deployments of software programs to distributed computing environments.

BACKGROUND

Distributed computing environments (e.g., cloud computing systems, data grids, and computing clusters) have recently grown in popularity given their ability to improve flexibility, responsiveness, and speed over conventional computing systems. To further improve their usability, some distributed computing environments include automation platforms. These automation platforms can assist with deploying, scaling, and otherwise managing software programs such as applications, microservices, and serverless functions. One example of an automation platform is an orchestration platform. Orchestration platforms can help manage the deployment of software programs inside containers or virtual machines, which are different types of isolated virtual environments. Orchestration platforms and other automation platforms can help manage software programs to reduce the burden on users.

One popular orchestration platform is Kubernetes. Distributed computing environments running Kubernetes can be referred to as Kubernetes environments. Kubernetes environments have reconciliation functionality through which a user can declare a target deployment state for a software program and the Kubernetes environment can automatically monitor the target software program to detect divergences from this target deployment state. Upon detecting any such divergences, the Kubernetes environment can automatically resolve them. To implement this functionality, a user can draft a deployment specification with deployment parameters designating the target deployment state for a target software program. One example of the target deployment state can be that a particular number of instances (e.g., replicas) of the target software program should be running at a given point in time. The deployment specification is then provided to the Kubernetes environment, which can monitor the target software program for divergences from the target deployment state. If the Kubernetes environment detects any such divergences, it can dynamically adjust itself to conform to the target deployment state (e.g., by scaling up or down the number of instances of the software program that are deployed at a given point in time). Other orchestration and automation platforms may also have similar reconciliation capabilities.

BRIEF DESCRIPTION OF THE DRAWINGS

FIG. 2 shows an example of a deployment specification according to some aspects of the present disclosure.

DETAILED DESCRIPTION

Figure 1:
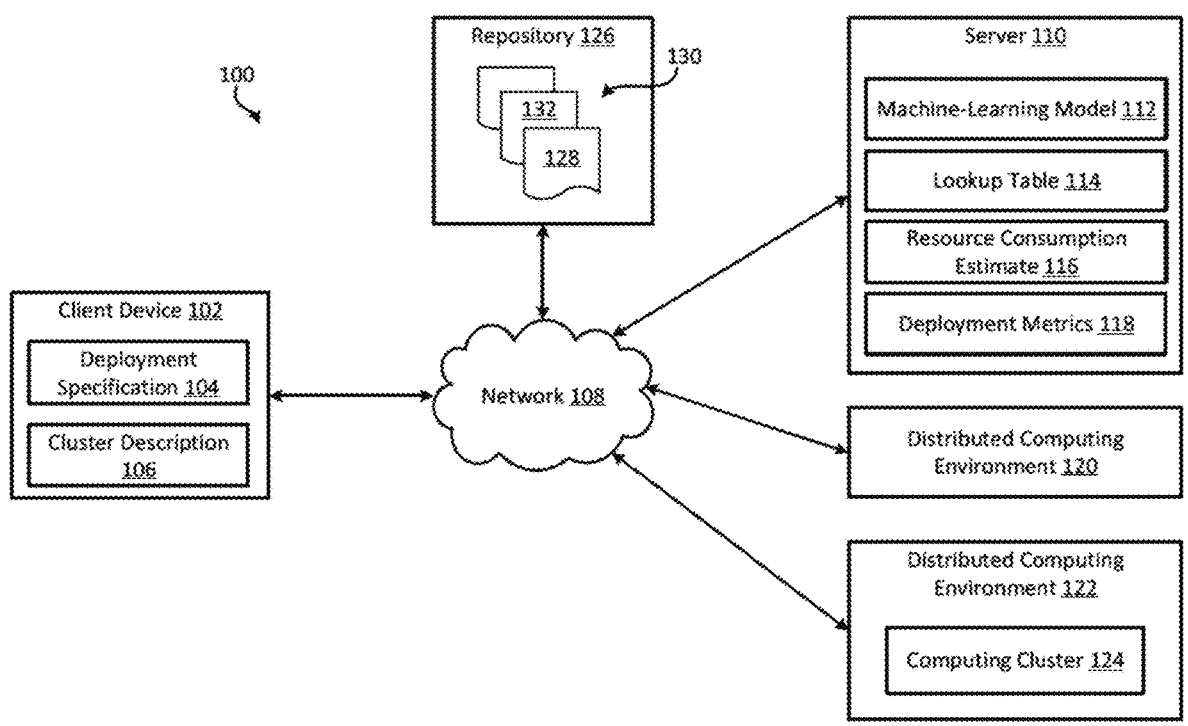
FIG. 1 shows a block diagram of an example of a system according to some aspects of the present disclosure.

Entities are increasingly deploying software programs to distributed computing environments hosted by service providers, such as Red Hat®, Amazon®, Google®, and Microsoft®. For a software program to properly function once it is deployed, an entity may need to configure the distributed computing environment beforehand to handle the software program correctly. This may involve an entity requesting or allocating sufficient computing resources (e.g., processing power, memory, and storage space) from the service provider to handle the software program, among other things. But knowing ahead-of-time how much of each computing resource to allocate to the software program can be challenging. These technical details are generally not provided with software programs because they are highly variable, in that they depend on the software program's specific configuration and the characteristics of the specific computing environment to which the software program is deployed. For example, the same software program may consume different amounts of computing resources on different computing environments hosted by different service providers. Even the developers of a software program may not know these technical details, since they tend to focus more on higher-level details such as how software programs run (e.g., whether there are any bugs), interact, and scale than the underlying resource consumption. While some software developers may provide some vague hardware requirements with their software programs, such as a minimum processing speed or a minimum amount of memory required to run the software program, precise resource-consumption details are generally unavailable. These factors can make it challenging for an entity to preconfigure a computing environment to handle a software program or otherwise assess the merits of executing the software program in the computing environment. In many cases, it is not possible to obtain a good sense of the resource consumption of a software program until after it is deployed and is fully operational in a target computing environment.

Some examples of the present disclosure can overcome one or more of the abovementioned problems by providing a system that can generate one or more deployment metrics based on a deployment specification for a target software program, where the deployment metrics can be used to configure a target computing environment to handle the software program or to assess the merits of deploying the target software program in the computing environment. More specifically, the deployment specification can include one or more deployment parameters indicating a target deployment state for the software program in a target computing environment. Based on the deployment parameters, the system can estimate the resource consumption of the target software program once the target software program reaches the target deployment state. The system can then generate the deployment metrics based on the resource consumption estimate. Examples of the deployment metrics can include an efficiency metric indicating a resource consumption efficiency of the software program; a monetary cost associated with deploying the software program; a rank, grade, or other indicator of the desirability of the deploying the target software program in the target computing environment; a resource consumption percentage (e.g., a percentage of the total amount of available computing resources consumed by the software program); or any combination of these. Using these techniques, the system can convert a deployment specification into actionable deployment metrics that can allow users to make better decisions about how and where to deploy their software programs, for example to ensure proper operation of the software programs and to avoid draining limited computing resources.

The deployment specification used to generate the deployment metrics is a text file or another data structure that includes text in a declarative format, through which a developer or other entity can declare a target deployment state (e.g., a desired or expected deployment state) for the target software program. The deployment specification may be drafted in any suitable language, such as YAML or XML. The target deployment state is generally not the initial deployment state of the target software program in the target computing environment, but rather it is a deployment state of the target software program that is eventually reached after a period of time has passed subsequent to the initial deployment. The target deployment state can be declared by an entity setting one or more deployment parameters in the deployment specification.

The deployment specification is separate from the target software program and is designed to be ingested by an automation framework such as Kubernetes for enabling the automation framework to execute a reconciliation process for conforming the software program to the target deployment state. Thus, the deployment specification is not the program code (e.g., source code) for the target software program nor does it define the actual functionality of the target software program. Since the automation framework can automatically and relatively continuously execute the reconciliation process, there is a high likelihood that the software program will operate in the target deployment state much or most of the time after it is deployed in the target computing environment. As a result, the target software program's resource consumption when it is in the target deployment state can serve as a reasonably proxy for the target software program's resource consumption overall. Some examples of the present disclosure can leverage this fact by using the deployment parameters in the deployment specification as a basis by which to estimate resource consumption of the target software program in the target deployment state. The estimated resource consumption of the target software program can then be used to determine the deployment metrics, as described above.

In addition to being a good source of information, deployment specifications are also readily available and easy to create. Many software programs come with deployment specifications. And entities (e.g., software developers and systems administrators) are generally more adept at creating deployment specifications, given their higher-level nature and the wide range of available documentation, than estimating underlying resource consumption. As a result, deployment specifications can serve as a simple and readily available source of information from which accurate estimates of resource consumption can be derived for use in generating deployment metrics.

In some examples, the system can generate deployment metrics for multiple candidate computing environments so that a user can compare them to one another to determine where to deploy the target software program. For example, the user may provide a single deployment specification for a target software program as input to the system. The user may also select multiple candidate computing environments (e.g., hosted by multiple service providers) to which the target software program can be deployed. The system can estimate the resource consumption of the target software program in each of the candidate computing environments based on the deployment specification. The system can then determine deployment metrics based on the resource consumption associated with each of the candidate computing environments. The system can provide the deployment metrics to the user, so that the user can compare the deployment metrics for the candidate computing environments to one another for selecting a target computing environment to which to deploy the target software program.

In some examples, the deployment metrics can serve as feedback to the user about the deployment specification. For example, the deployment metrics generated by the system may indicate one or more potential problems with deploying the target software program in accordance with the deployment specification. Examples of such problems may be that the target software program would consume too many computing resources or may be too financially expensive to run in the target deployment state. Based on the deployment metrics, the user may identify these issues and modify the deployment specification to account for (e.g., mitigate) them. In this way, the deployment metrics can help the user revise the deployment specification to improve the resulting software deployments.

These illustrative examples are given to introduce the reader to the general subject matter discussed here and are not intended to limit the scope of the disclosed concepts. The following sections describe various additional features and examples with reference to the drawings in which similar numerals indicate similar elements but, like the illustrative examples, should not be used to limit the present disclosure.

FIG. 1 shows a block diagram of an example of a system 100 according to some aspects of the present disclosure. The system 100 includes a client device 102 in communication with a server 110 via a network 108, such as a local area network or the Internet. Examples of the client device 102 can include a laptop computer, desktop computer, mobile phone, or tablet. In general, the client device 102 can transmit a deployment specification 104 for a target software program to the server 110, which can receive the deployment specification 104 and generate a resource consumption estimate 116 and deployment metrics 118 based on the deployment specification 104. The server 110 can then transmit the resource consumption estimate 116, the deployment metrics 118, or both of these back to the client device 102.

More specifically, the client device 102 can include the deployment specification 104 for a target software program. The deployment specification 104 may be generated by a user of the client device 102, for example using a word processor or another type of text editor. Alternatively, the deployment specification 104 may be generated by a developer of the target software program or another entity and made available to the user of the client device 102. Either way, the deployment specification 104 is separate from the target software program and can include deployment parameters indicating a target deployment state for the target software program when the target software program is deployed in a computing environment, such as distributed computing environment 122.

One example of a deployment specification 200 is shown in FIG. 2. In this example, the deployment specification 200 is a Kubernetes resource definition of the kind "Deployment" for a web server called "Nginx." Thus, Nginx is the target software program in this example. The deployment specification 200 is drafted in a YAML format and includes numerous deployment parameters. Examples of the deployment parameters include a number of replicas of the target software program to deploy in a computing environment (e.g., for failover or redundancy purposes), various labels to be used by Kubernetes in relation to the deployment, the name of a container (e.g., Docker container) that will include the target software program, the name and version of the container image ("image") used to deploy the target software program, the port of the container through which the target software program is accessible, names and types of storage volumes used by the target software program, and so on. These deployment parameters can characterized the network resources such as ports and storage volumes, replicas, and container details for the target software program, among other things. Together, the deployment parameters can define a target deployment state for the target software program when it is deployed in a computing environment. Of course, the example in FIG. 2 is intended to be illustrative and non-limiting. Other examples may include more deployment parameters, fewer deployment parameters, different deployment parameters, or a different configuration of deployment parameters than is shown in FIG. 2. In some cases, a single deployment specification 200 may have dozens or hundreds of deployment parameters for more complex deployments.

To obtain more information about a deployment of the target software program, a user of the client device 102 can transmit the deployment specification 104 to the server 110. The server 110 can receive the deployment specification 104 and determine a resource consumption estimate 116 based on the deployment specification 104. The server 110 can determine the resource consumption estimate 116 using a mapping of one or more deployment parameters to one or more resource consumption values.

In some examples, the mapping can include a lookup table 114. The lookup table 114 can be generated based on testing or historical information about the resource consumption of the same or similar deployments in one or more computing environments, such as distributed computing environments 120, 122. The lookup table 114 may be manually generated or automatically generated. The lookup table 114 can correlate each deployment parameter to one or more resource consumption values. Examples of resource consumption values can include the memory consumption, processing-power consumption, and storage consumption. As one particular example, the deployment specification 104 may be for a web server called Nginx. The lookup table 114 may indicate that a single replica of Nginx consumes 5 megabytes (MB) of memory and 100 MB of storage space. Based on a deployment parameter of the deployment specification 104 indicating that the target deployment state for Nginx is to include three replicas, the server 110 can multiply the above values by three to generate resource consumption values of 15 MB and 300 MB, respectively. Additionally, the lookup table 114 may indicate that a storage volume for a webserver consumes 10 gigabytes (GB) of storage space. Based on a deployment parameter of the deployment specification 104 indicating that the target deployment state for Nginx is to involve the storage volume, the server 110 can add 10 GB to the running total of the storage space associated with the target deployment state for Nginx. The server 110 can repeat this process for some or all of the deployment parameters in the deployment specification 104 to generate running totals for the resource consumption values. For example, the server 110 can generate running totals for memory consumption, processing-power consumption, and storage-space consumption associated with the target deployment state of the target software program. These totals may individually or collectively serve as the resource consumption estimate 116.

In other examples, the mapping can be one or more models such as one or more machine-learning models 112. Examples of such a machine-learning model 112 can include a neural network, support vector machine, or classifier. The machine-learning model 112 can be trained based on historical information about the resource consumption of the same or similar deployments in one or more computing environments. For example, the machine-learning model 112 can be trained based on training data that includes deployment specifications correlated to resource consumption estimates. This training data can be generated by performing tests in one or more computing environments or based on logged resource-consumption information about similar deployments in one or more computing environments. Once trained, the machine-learning model 112 can be configured to receive the deployment parameters as input and generate an output that includes the resource consumption values, the resource consumption estimate 116, or both of these. For example, the machine-learning model 112 may output the resource consumption estimate 116 along with a breakdown of the underlying resource-consumption values that yielded the resource consumption estimate 116.

Based on the resource consumption estimate 116, the server 110 can determine one or more deployment metrics 118. For example, the server 110 can determine a monetary cost associated with each of the resource-consumption values, where the cost can be an amount charged by a service provider for consuming a particular amount of a particular computing resource. The server 110 can make these determinations based on stored cost data or by interfacing with a cost analysis tool provided by the service provider. Each of the costs can itself be a deployment metric 118 or can serve as an intermediate value usable to generate the deployment metric 118. For example, the server 110 can combine together (e.g., add) these intermediate costs to generate a total cost, which can then serve as the deployment metric 118.

As another example, the server 110 can determine a score or grade for the deployment based on the resource-consumption values. To do so, the server 110 can determine a weighted score for each of the resource-consumption values and combine together the weighted scores into a total score. The weight values may be preset. The total score may range for example from 0-100, where a higher score may indicate a more resource-intensive deployment and a lower score may indicate a less resource-intensive deployment. The total score may itself serve as a deployment metric 118 or may be converted into a letter grade that can be used as the deployment metric 118. The score or letter grade may indicate how resource intensive the deployment may be. If the score or letter grade indicates that the deployment will consume a large amount of computing resources, this information may serve as feedback to the user that the deployment specification 104 may need revision or that the deployment may negatively impact the performance of the computing environment.

As yet another example, the server 110 can determine one or more resource consumption percentages based on the resource-consumption values. A resource consumption percentage can indicate what percentage of the total amount of a particular computing resource (e.g., allocated to the user) would be consumed by the target software program. For example, the server 110 can determine what percentage of the total available RAM would be consumed by the target software program. Additionally or alternatively, the server 110 can determine what percentage of the total available processing power would be consumed by the target software program. Additionally or alternatively, the server 110 can determine what percentage of the total available bandwidth would be consumed by the target software program. To determine such a resource consumption percentage, the server 110 can determine the total available amount of a particular computing resource that is allocated to the user in a particular computing environment. The server 110 may receive this information as user input or may determine this information based on the user's subscription level with a service provider of the particular computing environment. The server 110 can then divide the resource-consumption value for a particular computing resource by the total available amount of that particular computing resource to determine a resource consumption percentage for that particular computing resource.

In some examples, the server 110 can generate the deployment metrics 118 by using the one or more machine-learning models 112. The machine-learning models used to generate the deployment metrics may be the same as or different from the machine-learning models used to generate the resource consumption estimate 116. The machine-learning model 112 can be configured to receive the deployment parameters or the resource consumption estimate 116 as input and generate an output including the deployment metrics 118. In some examples in which the machine-learning model 112 receives the deployment parameters as input, the machine-learning model 112 may generate the resource consumption estimate 116 as an internal value, which may then be used internally by the machine-learning model 112 to generate and output the deployment metrics 118. Such a machine-learning model can be trained, for example, based on training data that correlates different combinations of input deployment parameters to output deployment metrics 118. In other examples in which the machine-learning model 112 receives the resource consumption estimate 116 as input, the machine-learning model can be trained, for example, based on training data that correlates input resource-consumption estimates to output deployment metrics 118.

In some examples, the server 110 can use a cluster description 106 in any of the processes described above for determining the deployment metrics 118. The server 110 can receive the cluster description 106 from the client device 102, the computing cluster 124, or another source. The cluster description 106 may be manually drafted by a user or automatically generated. The cluster description 106 can describe one or more characteristics of a computing cluster 124 to which the target software program is to be deployed. Examples of the characteristics can include a topology, shape, and geographical location of the computing cluster 124. Other examples of characteristics can include hardware specifications and software specifications of the computing cluster 124. The hardware specifications may include the number and type of processing devices (e.g., cores), storage devices, and other network devices available in the computing cluster 124. The software specifications may include the number and type of software programs deployed in the computing cluster 1124. In some examples, the computing cluster 124 can be a particular subpart of a distributed computing environment 122, where that subpart is assigned to a particular user. For example, the computing cluster 124 can be assigned to the user's account with the service provider of the distributed computing environment 112, such that only those entities with access to the user's account can access the computing cluster 124. After receiving the cluster description 106, the server 110 may provide at least some of the cluster description 106 as input to a machine-learning model 112 or a cost-analysis tool, or otherwise use the cluster description 106 in one or more of the processes described above, to determine the deployment metrics 118.

After determining the one or more deployment metrics 118, the server 110 can provide the deployment metrics 118 back to the user of the client device 102. The user can then make a more informed decision about the deployment, for example whether the deployment will consume too many computing resources, be too expensive, or have another undesirable characteristic. If so, the user may adjust the deployment specification 104, select another computing environment or service provider on which to deploy the target software program, or a combination thereof to reduce or avoid these problems.

Figure 3:
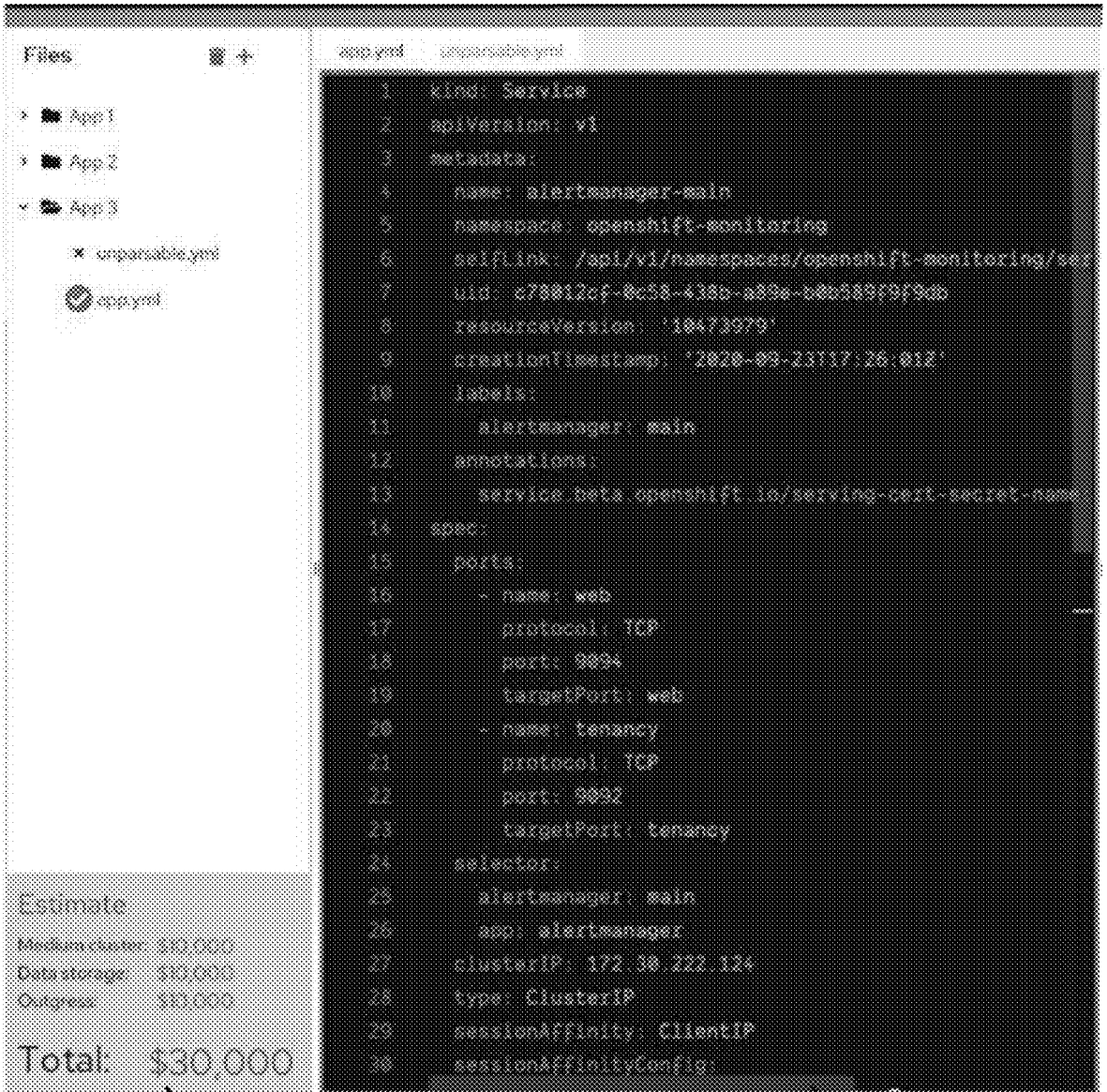
FIG. 3 shows a block diagram of an example of a graphical user interface according to some aspects of the present disclosure.

In some examples, the deployment metrics 118 can be output to the user in a graphical user interface. The graphical user interface may be part of a text editor or other software usable for drafting the deployment specification 104. One example of the graphical user interface 300 is shown in FIG. 3. As shown, the right side 302 of the graphical user interface 300 includes a text editor for drafting the deployment specification 104. The left side 304 of the graphical user interface 300 has a file list of selectable deployment specifications. The bottom left corner of the graphical user interface 300 shows the deployment metrics 118, which in this example includes cost estimates based on cluster size, data store, and outgress requirements associated with the deployment specification 104. These deployment metrics 118 can be determined by the server 110 based on the deployment parameters of the deployment specification 104 shown in the right side 302. In some examples, the deployment metrics 118 can be determined and automatically updated in substantially real time while the deployment specification 104 is being drafted by a user. Alternatively, the deployment metrics 118 can be determined and output in the graphical user interface 300 in response to a selection by the user of a button in the graphical user interface 300. While FIG. 3 shows one example of a graphical user interface 300, in will be appreciated that other examples may include more graphical features, fewer graphical features, different graphical features, or a different configuration of graphical features than is shown in FIG. 3.

As described above, the server 110 can use a mapping to determine the resource consumption estimate 116. In some examples, the server 110 may have access to multiple different mappings 130 of deployment parameters to resource consumption values. The mappings 130 may be stored in a repository 126 or another storage facility that is accessible to the server 110. Each of the mappings 130 may correspond to (e.g., may be unique or specific to) a particular computing environment hosted by a particular service provider. For example, mapping 128 may corresponding to distributed computing environment 120, which can be hosted by Service Provider A. An example of Service Provider A can be Red Hat®. Mapping 132 may corresponding to distributed computing environment 122, which can be hosted by Service Provider B. An example of Service Provider B can be Google®. Having different mappings for different computing environments or service providers can yield more accurate resource-consumption estimates that take these differences into account. Alternatively, a single mapping 128 may be used for multiple computing environments hosted by the same service provider or different service providers. The server 110 can determine which of the mappings 130 to use for generating the resource consumption estimate 116 in any suitable manner.

For example, the server 110 can determine which of the mappings 130 to use based on a selection from a user of the client device 102. For example, the user can select multiple computing environments or multiple service providers as candidates for a deployment of the target software program. The user may provide the selections to the server 110 in conjunction with the deployment specification 104. The server 110 can receive the selections, obtain the corresponding mappings from the repository 126 based on the selections, and generate multiple resource consumption estimates 116 based on the obtained mappings. Each of the resource consumption estimates 116 can correspond to a respective computing environment or a respective service provider associated with one of the mappings. The server 110 may then generate deployment metrics 118 based on the resource consumption estimates 116. For example, the server 110 can generate a respective deployment metric based on each respective resource-consumption estimate. The server 110 can then transmit the deployment metrics 118, the resource consumption estimates 116, or both to the client device 102. The user can compare this information when deciding which computing environment or service provider to use for deploying the target software program.

Although FIG. 1 shows a particular number and combination of components, this is intended to be illustrative and non-limiting. Other examples may include more components, fewer components, different components, or a different combination of components than is shown in FIG. 1. For example, the server 110 may be part of the distributed computing environment 122 to which a target software program is to be deployed.

Figure 4:
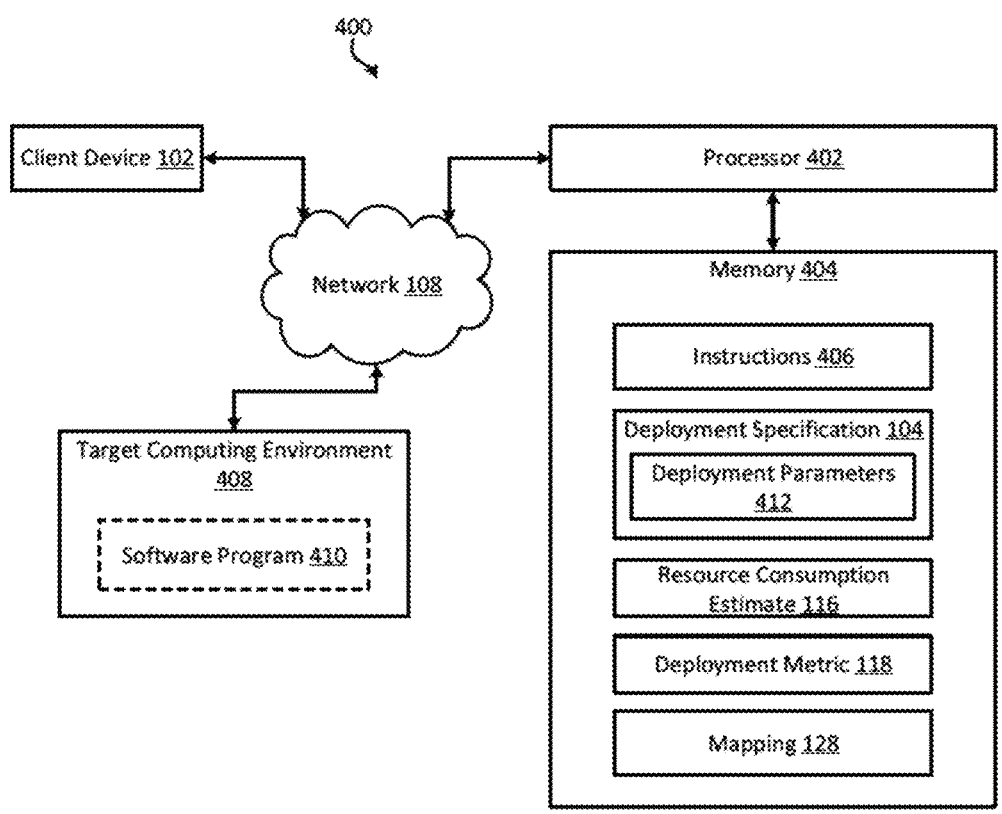
FIG. 4 shows a block diagram of another example of a system according to some aspects of the present disclosure.

FIG. 4 shows a block diagram of another example of a system 400 according to some aspects of the present disclosure. The system 400 includes a processor 402 that is communicatively coupled to a memory 404. In some examples, the processor 402 and the memory 404 can be part of the same computing device, such as the server 110 of FIG. 1. In other examples, the processor 402 and the memory 404 can be distributed from (e.g., remote to) one another.

The processor 402 can include one processor or multiple processors. Examples of the processor 402 include a Field-Programmable Gate Array (FPGA), an application-specific integrated circuit (ASIC), a microprocessor, etc. The processor 402 can execute instructions 406 stored in the memory 404 to perform operations. The instructions 406 may include processor-specific instructions generated by a compiler or an interpreter from code written in any suitable computer-programming language, such as C, C++, C#, etc.

The memory 404 can include one memory or multiple memories. The memory 404 can be non-volatile and may include any type of memory that retains stored information when powered off. Examples of the memory 404 include electrically erasable and programmable read-only memory (EEPROM), flash memory, or any other type of non-volatile memory. At least some of the memory 404 can include a computer-readable medium from which the processor 402 can read instructions 406. A computer-readable medium can include electronic, optical, magnetic, or other storage devices capable of providing the processor 402 with computer-readable instructions or other program code. Examples of computer-readable mediums include magnetic disks, memory chips, ROM, random-access memory (RAM), an ASIC, a configured processor, optical storage, or any other medium from which a computer processor can read the instructions 406.

The processor 402 can execute the instructions 406 to perform operations. For example, the processor 402 can receive a deployment specification 104 having deployment parameters 412 that define a target deployment state for a software program 410 deployable to a target computing environment 408. The processor 402 can also receive a mapping 128 of the deployment parameters 412 to resource consumption values. In some examples, the mapping 128 can include a lookup table or a model, such as a machine-learning model. The processor 402 can generate, based on the mapping 128, a resource consumption estimate 116 associated with the target deployment state of the software program 410 in the target computing environment 408. The processor 402 can generate at least one deployment metric 118 based on the resource consumption estimate 116. The deployment metric 118 may be the same as or may be different from the resource consumption estimate 116. The processor 402 can then transmit the deployment metric 118 to a client device 102. The client device 102 can receive the deployment metric 118 and output the deployment metric 118 on a display device (e.g., a liquid crystal display (LCD) or a light-emitting diode (LED) display) to a user of the client device 102. This can enable the user to make or more decisions about deploying the software program 410 to the target computing environment 408.

Figure 5:
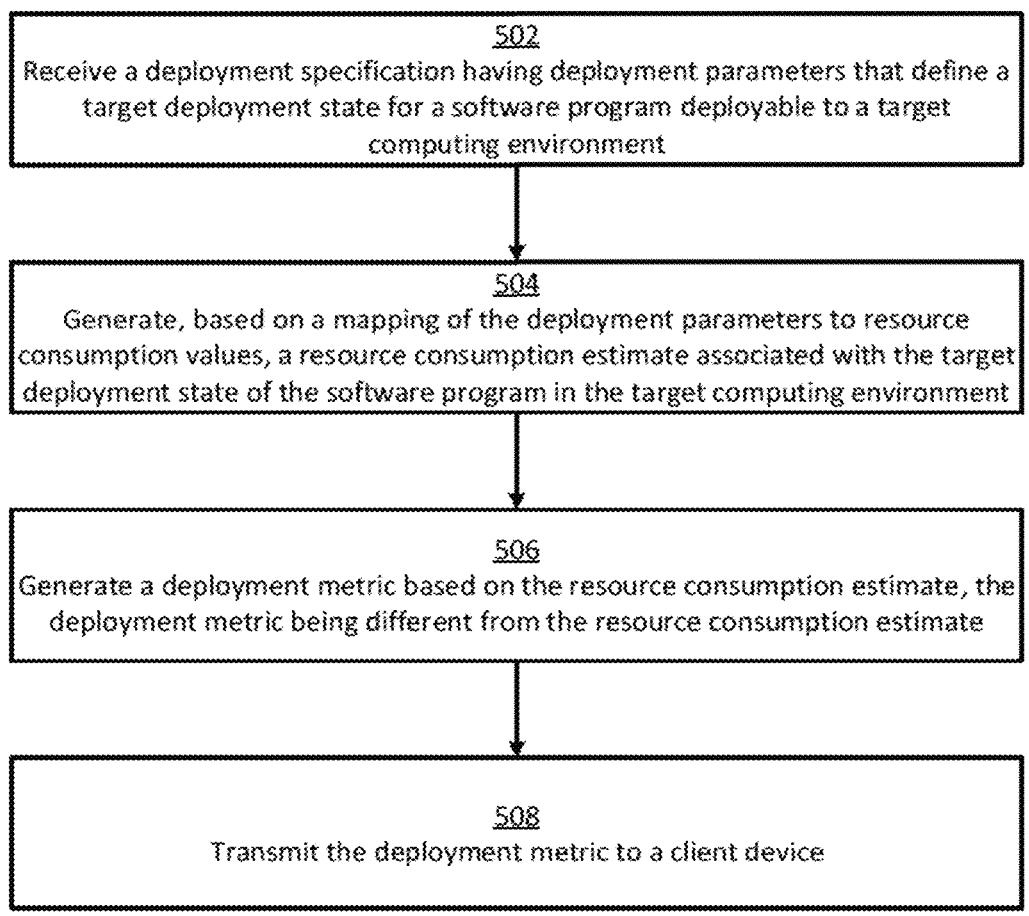
FIG. 5 shows a flow chart of an example of a process according to some aspects of the present disclosure.

FIG. 5 shows a flow chart of an example of a process according to some aspects of the present disclosure. Other examples can include more steps, fewer steps, different steps, or a different order of the steps than is shown in FIG. 5. The steps of FIG. 5 are discussed below with reference to the components discussed above in relation to FIG. 4.

In block 502, the processor 402 receives a deployment specification 104 having one or more deployment parameters 412 that define a target deployment state for a software program 410 deployable to a target computing environment 408. The processor 402 can receive the deployment specification 104 from any suitable source, such as from a user (e.g., as user input) or a remote client device 102.

In block 504, the processor 402 generates a resource consumption estimate 116 associated with the target deployment state of the software program 410 in the target computing environment 408. The processor 402 can generate the resource consumption estimate 116 based on a mapping 128 of the one or more deployment parameters 412 in the deployment specification 104 to one or more resource consumption values.

In block 506, the processor 402 generates at least one deployment metric 118 based on the resource consumption estimate 116. The deployment metric 118 may be the same as or may be different from the resource consumption estimate 116. For example, the deployment metric may be a cost estimate associated with deploying the software program 410 on the target computing environment 408. To generate the deployment metric 118, the processor 402 can supply the resource consumption estimate 116 as input to a software tool (e.g., via an application programming interface) provided by a service provider of the target computing environment 408. The software tool can determine the cost estimate based on the resource consumption estimate 116 and transmit it back to the processor 402. Alternatively, the processor 402 can provide the resource consumption estimate 116 as input to a model to obtain the cost estimate as output from the model. If the model is a machine-learning model such as a neural network, the model may be trained using historical information that relates resource consumption to previous costs associated with the same or similar deployments. As another alternative, the processor 402 may determine the cost estimate based on a lookup table that maps resource consumption estimates to the cost estimates. The lookup table may be manually generated by one or more users, for example based on historical information that relates resource consumption to previous costs associated with the same or similar deployments.

In block 508, the processor 402 transmits the deployment metric 118 to a client device 102. The processor 402 can transmit the deployment metric 118 to the client device 102 via one or more networks 108. The client device 102 can receive the deployment metric 118 and output the deployment metric 118 to a user of the client device 102. In some examples, the deployment metric 118 can be output in a graphical user interface. The graphical user interface that may be specifically designed for creating deployment specifications or otherwise usable for creating deployment specifications.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

The invention claimed is:

1. A non-transitory computer-readable medium comprising program code that is executable by a processor for causing the processor to:
   receive a deployment specification having deployment parameters that define a target deployment state for a software program deployable to a target computing environment;
   access a plurality of mappings of a plurality of deployment parameters to a plurality of resource consumption values, the plurality of mappings corresponding to a plurality of distributed computing environments hosted by a plurality of service providers, each mapping in the plurality of mappings corresponding to a respective service provider of the plurality of service providers;
   generate, based on the plurality of mappings, a plurality of resource consumption estimates associated with the target deployment state of the software program in the plurality of distributed computing environments, each resource consumption estimate of the plurality of resource consumption estimates corresponding to a respective service provider of the plurality of service providers;
   generate a plurality of deployment metrics based on the plurality of resource consumption estimates, the plurality of deployment metrics being different from the plurality of resource consumption estimates, each deployment metric in the plurality of deployment metrics being generated based on a respective resource consumption estimate of the plurality of resource consumption estimates; and
   transmit the plurality of deployment metrics to a client device for comparison to one another by a user of the client device.

2. The non-transitory computer-readable medium of claim 1, wherein the software program is not deployed in the plurality of distributed computing environments prior to transmitting the deployment metric to the client device.

3. The non-transitory computer-readable medium of claim 1, wherein at least one mapping of the plurality of mappings includes a predefined lookup table that correlates deployment parameters to resource consumption values.

4. The non-transitory computer-readable medium of claim 1, wherein at least one mapping of the plurality of mappings includes a trained machine-learning model, the trained machine-learning model being configured to receive deployment parameters as input and generate an output that includes resource consumption values or a resource consumption estimate.

5. The non-transitory computer-readable medium of claim 1, wherein the deployment specification is part of a resource definition for Kubernetes, and wherein the plurality of distributed computing environments include a cloud computing environment.

6. The non-transitory computer-readable medium of claim 1, wherein the plurality of deployment metrics include a cost estimate associated with deploying the software program in the target computing environment.

7. The non-transitory computer-readable medium of claim 1, wherein a resource consumption estimate of the plurality of resource consumption estimates includes resource consumption values for different types of computing resources, further comprising program code that is executable by the processor for causing the processor to generate a deployment metric of the plurality of deployment metrics by:
   determining intermediate deployment-metric values based on the resource consumption values, the intermediate deployment-metric values being different than resource consumption values; and
   generating the deployment metric by combining together the intermediate deployment-metric values.

8. The non-transitory computer-readable medium of claim 1, further comprising program code that is executable by the processor for causing the processor to generate a deployment metric of the plurality of deployment metrics based on a resource consumption estimate of the plurality of resource consumption estimates by executing a trained machine-learning model, the trained machine-learning model being configured to receive deployment parameters or the resource consumption estimate as input and generate an output including the deployment metric.

9. The non-transitory computer-readable medium of claim 1, further comprising program code that is executable by the processor for causing the processor to:
   receive a cluster description that describes characteristics of a computing cluster assigned to a user of the software program, the computing cluster being a particular subpart of the target computing environment; and
   determine a deployment metric of the plurality of deployment metrics based on the characteristics in the cluster description.

10. The non-transitory computer-readable medium of claim 1, further comprising program code that is executable by the processor for causing the processor to transmit a resource consumption estimate of the plurality of resource consumption estimates to the client device.

11. The non-transitory computer-readable medium of claim 1, further comprising program code that is executable by the processor for causing the processor to generate a graphical user interface, the graphical user interface being configured to receive the deployment specification as input from the user of the client device and output a deployment metric of the plurality of deployment metrics to the user.

12. A method comprising:
   receiving, by a processor, a deployment specification having deployment parameters that define a target deployment state for a software program deployable to a target computing environment;
   accessing, by the processor, a plurality of mappings of a plurality of deployment parameters to a plurality of resource consumption values, the plurality of mappings corresponding to a plurality of distributed computing environments hosted by a plurality of service providers, each mapping in the plurality of mappings corresponding to a respective service provider of the plurality of service providers;

generating, by the processor and based on the plurality of mappings, a plurality of resource consumption estimates associated with the target deployment state of the software program in the plurality of distributed computing environments, each resource consumption estimate of the plurality of resource consumption estimates corresponding to a respective service provider of the plurality of service providers;

generating, by the processor, a plurality of deployment metrics based on the plurality of resource consumption estimates, the plurality of deployment metrics being different from the plurality of resource consumption estimates, each deployment metric in the plurality of deployment metrics being generated based on a respective resource consumption estimate of the plurality of resource consumption estimates; and transmitting, by the processor, the plurality of deployment metrics to a client device for comparison to one another by a user of the client device.

13. The method of claim 12, wherein at least one mapping in the plurality of mappings includes a predefined lookup table that correlates deployment parameters to resource consumption values.

14. The method of claim 12, wherein at least one mapping in the plurality of mappings includes a trained machine-learning model, the trained machine-learning model being configured to receive deployment parameters as input and generate an output that includes resource consumption values, a resource consumption estimate, or a deployment metric.

15. The method of claim 12, wherein a resource consumption estimate of the plurality of resource consumption estimates includes resource consumption values for different types of computing resources, and further comprising generating a deployment metric of the plurality of deployment metrics by:
  determining intermediate deployment-metric values based on the resource consumption values, the intermediate deployment-metric values being different than resource consumption values; and
  generating the deployment metric by combining together the intermediate deployment-metric values.

16. The method of claim 12, further comprising generating a deployment metric of the plurality of deployment metrics based on a resource consumption estimate of the plurality of resource consumption estimates by executing a trained machine-learning model, the trained machine-learning model being configured to receive deployment parameters or the resource consumption estimate as input and generate an output including the deployment metric.

17. The method of claim 12, further comprising:
  receiving a cluster description that describes characteristics of a computing cluster assigned to a user of the software program, the computing cluster being a particular subpart of the target computing environment; and
  determining a deployment metric of the plurality of deployment metrics based on the characteristics in the cluster description.

18. A system comprising:
a processor; and
a memory including instructions that are executable by the processor for causing the processor to:
  receive a deployment specification having deployment parameters that define a target deployment state for a software program deployable to a target computing environment;
  access a plurality of mappings of a plurality of deployment parameters to a plurality of resource consumption values, the plurality of mappings corresponding to a plurality of distributed computing environments hosted by a plurality of service providers, each mapping in the plurality of mappings corresponding to a respective service provider of the plurality of service providers;
  generate, based on the plurality of mappings, a plurality of resource consumption estimates associated with the target deployment state of the software program in the plurality of distributed computing environments, each resource consumption estimate of the plurality of resource consumption estimates corresponding to a respective service provider of the plurality of service providers;
  generate a plurality of deployment metrics based on the plurality of resource consumption estimates, the plurality of deployment metrics being different from the plurality of resource consumption estimates, each deployment metric in the plurality of deployment metrics being generated based on a respective resource consumption estimate of the plurality of resource consumption estimates; and
  transmit the plurality of deployment metrics to a client device for comparison to one another by a user of the client device.

\* \* \* \* \*